United States Patent [19]
Morrison et al.

[11] Patent Number: 6,116,338
[45] Date of Patent: Sep. 12, 2000

[54] INDUCER FOR INCREASING CENTRIFUGAL PUMP EFFICIENCY IN WELLS PRODUCING HIGH VISCOSITY CRUDE OIL

[75] Inventors: William R. Morrison, Barnsdall; Carl G. Woodworth, Ramona, both of Okla.; Robert P. Allen, Hays, Kans.

[73] Assignee: Green Country Supply, Inc., Tulsa, Okla.

[21] Appl. No.: 09/150,229

[22] Filed: Sep. 9, 1998

[51] Int. Cl.⁷ ..................................................... E21B 43/38
[52] U.S. Cl. ..................................... 166/105.5; 166/177.7
[58] Field of Search ............................. 166/105.5, 105.6, 166/177.7

[56] References Cited

U.S. PATENT DOCUMENTS

| | | | |
|---|---|---|---|
| 2,081,225 | 5/1937 | Coberly | 166/105.1 |
| 3,887,342 | 6/1975 | Bunnelle | 55/203 |
| 4,088,459 | 5/1978 | Tuzson | 96/207 |
| 4,386,653 | 6/1983 | Drake | 166/105 |
| 4,386,654 | 6/1983 | Becker | 166/105.5 |
| 4,481,020 | 11/1984 | Lee et al. | 55/203 |
| 4,981,175 | 1/1991 | Powers | 166/265 |
| 5,516,360 | 5/1996 | Normandeau et al. | 96/207 |
| 5,525,146 | 6/1996 | Straub | 96/214 |
| 5,588,486 | 12/1996 | Heinrichs | 166/50 |
| 5,653,286 | 8/1997 | McCoy et al. | 166/105.5 |

*Primary Examiner*—David Bagnell
*Assistant Examiner*—Jennifer R Dougherty
*Attorney, Agent, or Firm*—Molly D. McKay

[57] ABSTRACT

An device for use down-hole in an oil well for inducing heavy crude oil to flow into the inlet of a centrifugal pump by creating a positive pressure on the bottom inlet of the pump. The device inserts into the down-hole equipment string between the gas separator and the centrifugal pump. The device consists of an auger that attaches to and rotates with the shaft of an electric down-hole motor and a housing that surrounds the auger. The housing connects to the gas separator at the bottom end of the device and connects to the centrifugal pump at a top end of the device. The auger has tight clearance with the housing to enable the rotating auger to force the fluid upward within the housing as the auger rotates. The vanes of the auger are arranged so that the fluid is pushed with increasing pressure as it moves upward through the device to the centrifugal pump.

7 Claims, 3 Drawing Sheets

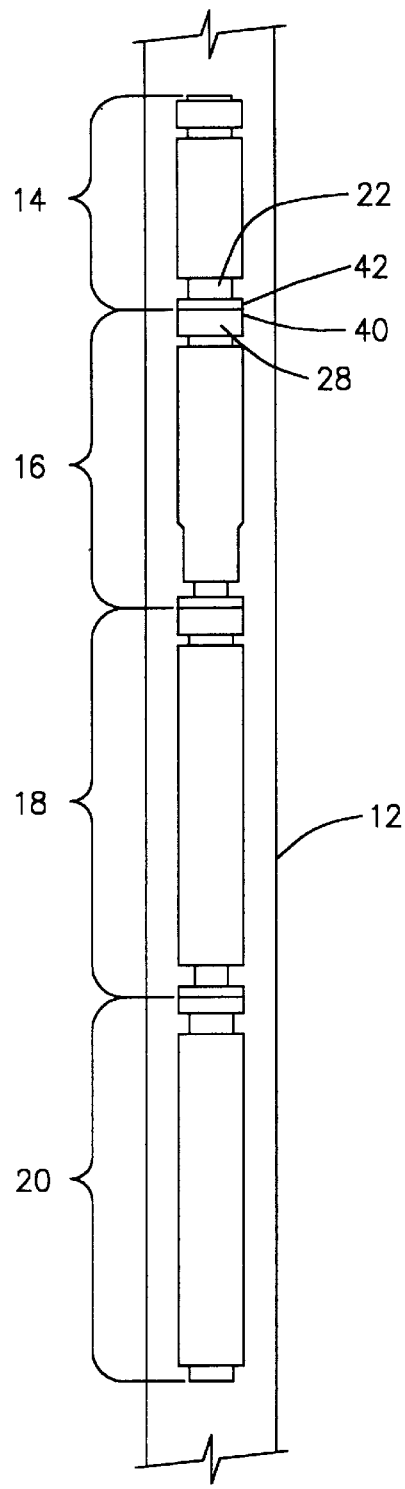
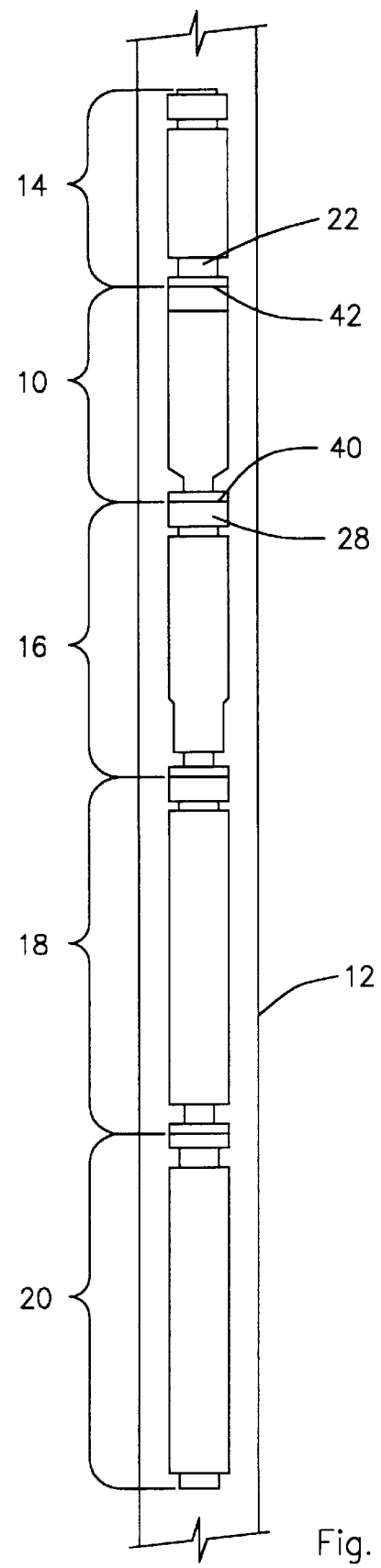
Fig. 2
(PRIOR ART)
Fig. 3

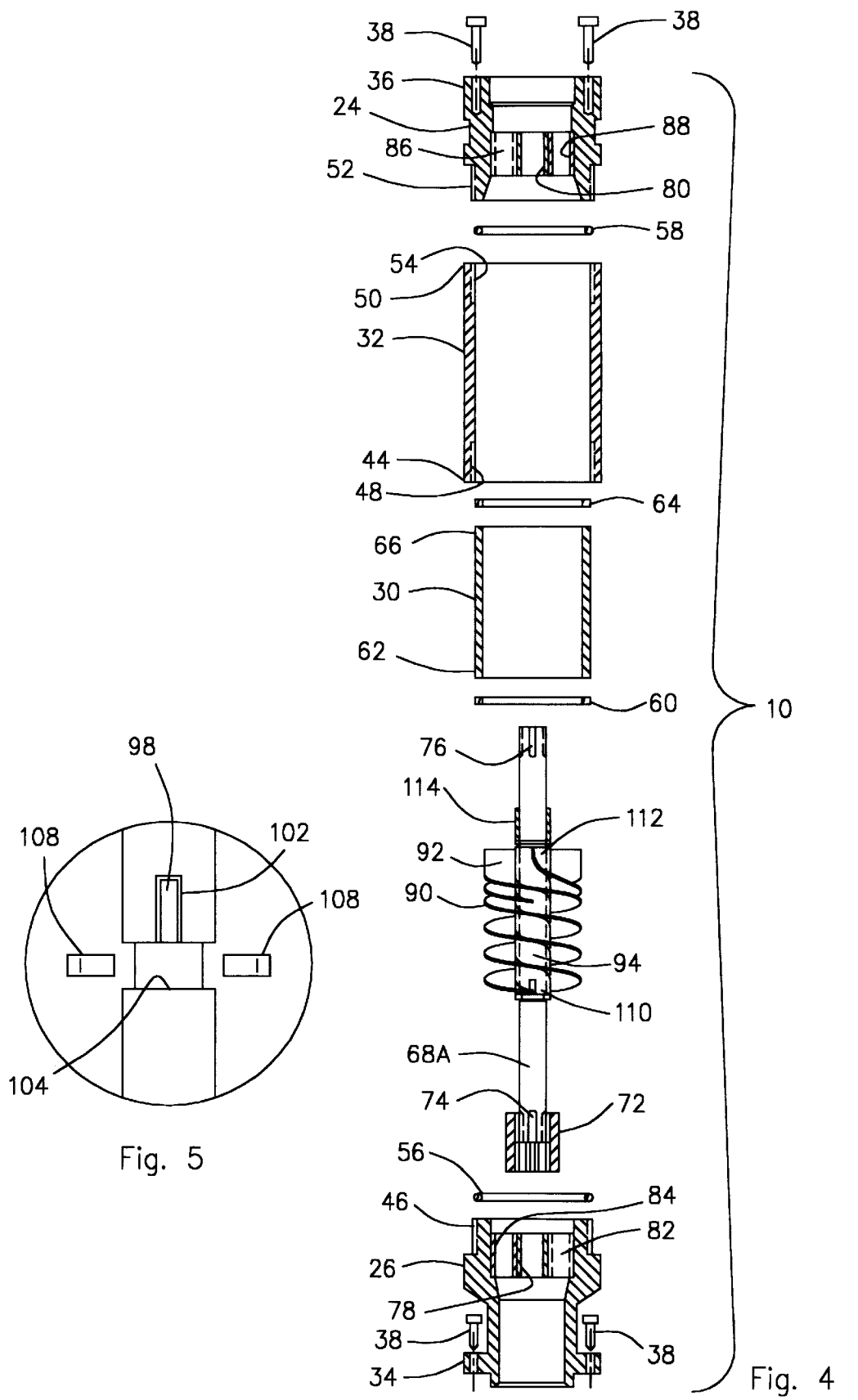

INDUCER FOR INCREASING CENTRIFUGAL PUMP EFFICIENCY IN WELLS PRODUCING HIGH VISCOSITY CRUDE OIL

BACKGROUND OF THE INVENTION

1. Field of the Invention

The present invention relates to a device for inducing and increasing the flow of heavy crude oil or viscous fluids into a centrifugal pump locate down-hole in an oil well. More specifically, the present invention attaches to the shaft of a centrifugal pump between the centrifugal pump and the gas separator. The invention serves to compress the residual gas that remains in the heavy crude oil after the oil has been degassed through a gas separator and forces the heavy crude oil into a centrifugal pump.

2. Description of the Related Art

When pumping oil wells that contain viscous crude oil with centrifugal pumps, the oil causes problems for the traditional down-hole degassing and pumping equipment. The viscosity of the oil prevents adequate release of residual gas upward within the well through the casing external to the pump and shaft. Because of the inadequate removal of the gas from the crude oil in the gas separator, the fluid that enters at the bottom of the centrifugal pump contains significant quantities of gas. As the fluid enters the lower two or three stages of a centrifugal pump, the fluid enters a low pressure or partial vacuum area formed by the normal spinning action of the pump. This partial vacuum or low-pressure area allows the residual gas that remains in the oil to be release, forming bubbles of gas within the heavy oil. This gas accumulates at the eye of the impeller in the low-pressure area of the pump since the impeller of the pump tends to sling the oil outward and upward within the stages of the pump. The presence of this free gas hampers the operation of the pump, causing it to operate much less efficiently, or causing the pump to gas lock.

The conventional method for addressing this problem is to use a larger pump and motor. The increased motor and pump size translates into higher electric operating costs and increased equipment costs per unit of oil pumped to the wellhead.

The current invention addresses this problem in a new way. The present invention is installed in the down-hole equipment string between the gas separator and the centrifugal pump. The invention serves to produce a continual positive pressure of fluids at the inlet of the centrifugal pump, thus causing the residual gases contained within the oil to remain dissolved as the oil enters the pump.

The invention consists of an auger that rotates within a housing. The rotating auger engages the fluid upon the fluid leaving the gas separator. The rotating auger positively pushes and lifts the fluid upward toward the bottom of the pump. As the fluid is moved upward within the housing by the auger, the residual gas is forced back into the fluid. When the fluid exits the top end of the invention and enters the lower end of the pump, the fluid is under pressure, instead of being under a vacuum. This allows the fluid to be induced into the lower stages of the pump by the normal rotational action of the pump with reduced interference from free gas.

By employing the present invention, the size of the pump motor can be reduced by approximately one half, thus decreasing the initial installation cost of the motor. More importantly, however, the present invention allows the pump to operate much more efficiently. Increased efficiency reduces the ongoing operational costs, i.e. the cost of electricity to operate the pump. This type of reduction in operational costs translates into savings of hundreds of dollars over the life of an oil well.

SUMMARY OF THE INVENTION

This invention is a device for inducing or pushing heavy crude oil fluids that have been partially degassed in a gas separator, into a centrifugal pump. Since the fluid is under pressure when it reaches the lower stages of the pump, the amount of residual gas that is released as the fluid enters the pump is minimized.

The inducer attaches between the gas separator and the centrifugal pump. The inducer is attached in such as way to the gas separator and pump that fluid exiting through the upper end of the gas separator must flow through a compression sleeve that lines a hollow housing of the inducer in order to reach the lower end of the pump. The inducer secures to the upper end of the gas separator via a base of the inducer and secures to the lower end of the pump via a head of the inducer. The base and the head are each provided with flanges that secure via bolts, respectively, to a flange provided on the upper end of the gas separator and a flange provided on the lower end of the pump.

The base and head secure on either end of the housing. An o-ring is provided between the base and the housing and another o-ring is provided between the head and the housing in order to prevent leakage of fluid, respectively, between the base and the housing and between the head and the housing. Likewise, a compression ring is provided between the base and a compression sleeve that lines the housing, and another compression ring is provided between the head and the sleeve in order to prevent leakage of fluid, respectively, between the base and the sleeve and between the head and the sleeve. The compression rings also serve to hold the sleeve securely to the housing so that the sleeve cannot rotate or move longitudinally within the housing.

The shaft from the electric motor extends upward within the casing of the well bore from the bottom of the well providing power to the pumping equipment. The shaft is composed of a plurality of shaft segments that are rotationally secured together with couplings. The shaft extends through the pump and the gas separator, and also extends through the inducer. The base and head of the inducer are each provided with bearings through which the rotating shaft extends. Each of the bearings is held in place within the inducer by means of a bearing support. Each bearing support is proved with a plurality of longitudinal openings extending longitudinally through the bearing support so that fluid can pass through the longitudinal openings as the fluid passes through the inducer.

The inducer is provided with an auger that extends longitudinally within the housing from the lower end of the housing to the upper end of the housing. The auger secures to the shaft by means of keys that insert into corresponding longitudinally oriented key-receiving grooves provided in the external surface of the shaft and in the internal central opening of the auger. The key-receiving grooves are provided at the lower end of the auger and at a corresponding point on the lower end of the shaft. The keys secure the auger rotationally to the shaft.

In order to prevent the auger from moving longitudinally relative to the shaft, the lower end of the shaft is provided with a ring groove for receiving a two piece ring. Also, the upper end of the shaft is provided with a ring groove for receiving a snap ring. Both the two piece ring and the snap ring extend outwardly from the shaft, forming lips around the shaft. These rings trap between them the lower and upper ends of the auger so that the auger can not move longitudinally relative to the shaft.

It is important that the two piece ring and the snap ring prevent the auger from moving longitudinally relative to the shaft because such longitudinal movement would loosen the keys and allow the keys to move out of their key-receiving grooves. This would disconnect the auger from the shaft and would prevent the auger from rotating. Without the auger rotating, the inducer would be inoperative. A spacing shim is also provided between the snap ring and the upper end of the auger.

The snap ring provided in the ring groove in the upper end of the shaft also serves as a stop for a spacer that is provided between the upper end of the auger and the bearing support for the bearing that is provided in the head.

The auger secures to the shaft between the bearings provided on the base and head so that the auger rotates with the shaft. The auger is in close clearance with an abrasion resistant compression sleeve that is provided within the hollow housing. Thus fluid that enters the bottom of the auger is trapped between the auger and the sleeve. The fluid is pushed upward between the vanes of the auger within the inducer, keeping the fluid under pressure as it approaches the inlet of the pump.

BRIEF DESCRIPTION OF THE DRAWINGS

FIG. 2 is a cut away side view of the typical down-hole equipment located within an oil well.

FIG. 3 is the oil well of FIG. 2 shown with the invention installed.

FIG. 4 is an exploded view of the inducer of FIG. 1.

FIG. 5 is an enlarged view of the oil well shaft, showing one of the keyways or grooves provided therein for receiving a locking key.

DETAILED DESCRIPTION OF THE PREFERRED EMBODIMENT

Invention

Figure 1:
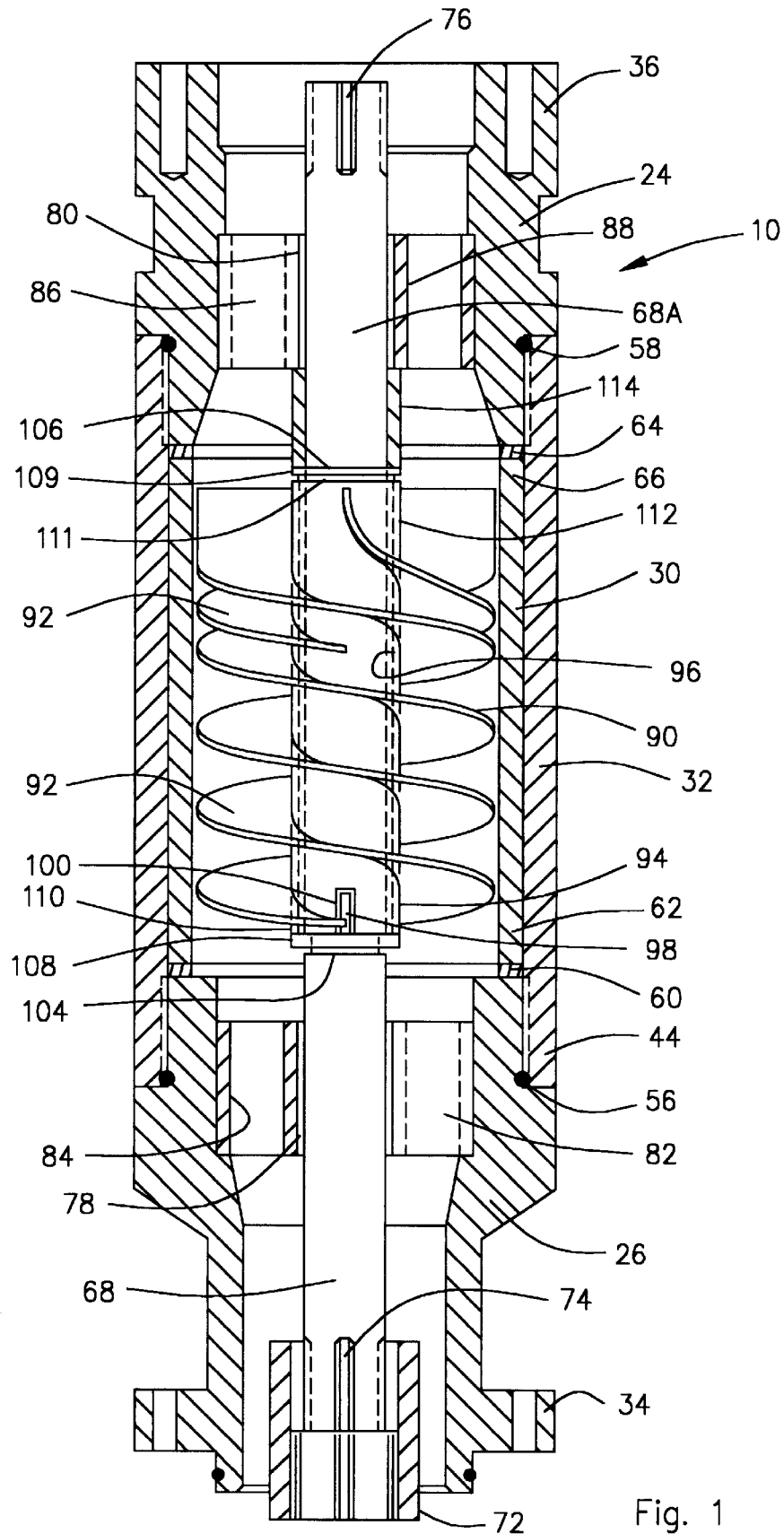
FIG. 1 is a cut away side view of an inducer constructed in accordance with a preferred embodiment of the present invention.

Referring now to the drawings and initially to FIG. 1, there is illustrated an inducer 10 for inducing the flow of heavy crude oil fluid within an oil well. The inducer 10 that is illustrated in FIG. 1 is constructed in accordance with a preferred embodiment of the present invention.

Referring now to FIGS. 2 and 3, the drawings illustrate the location where the inducer 10 is installed within a normal down-hole oil well equipment string. FIG. 2 shows the normal arrangement of equipment down-hole within a casing 12 of an oil well. The normal arrangement, as illustrated in FIG. 2, is a pump 14 located as the topmost piece of equipment, with a gas separator 16 located immediately below and attached to the pump 14. Next, a protector 18 is located immediately below and attached to the gas separator 16. Finally, a motor 20 is located immediately below and attached to the protector 18.

FIG. 3 illustrates the arrangement of equipment downhole when employing the inducer 10. The inducer 10 inserts between the pump 14 and the gas separator 16. The inducer 10 is located immediately below and attached to a lower end 22 of the pump 14 via a head 24 provided on the inducer 10. The gas separator 16 is located immediately below and attached to a base 26 provided on the inducer 10 via an upper end 28 of the gas separator 16. The protector 18 secures to the gas separator 16 and the motor 20 secures to the protector 18, as previously described for FIG. 2.

Specifically, the purpose of the inducer 10 is to force heavy crude oil fluid, that has previously been degassed in the gas separator 16, to enter the lower pressure, lower end of the pump 14 under positive pressure so that the fluid does not release additional gas as it enters.

Referring now to FIGS. 1 and 4, the structure and function of the inducer 10 will be described in detail.

The inducer 10 attaches to the gas separator 16 and to the pump 14. Fluid is forced to flow first through the base 26, then through a compression sleeve 30 that is provided within a hollow housing 32 of the inducer 10, and finally through the head 24 in order to reach the lower end 22 of the pump 14. The inducer 10 secures to the upper end 28 of the gas separator 16 via the base 26 and secures to the lower end 22 of the pump 14 via the head 24. The base 26 and the head 24 are each provided with a flange, 34 and 36 respectively. Flange 34 that secures by means of bolts 38 to a flange 40 provided on the upper end 28 of the gas separator 16, and flange 36 secures by means of bolts 38 to a flange 42 provided on the lower end 22 of the pump 14.

The base 26 secures to a lower end 44 of the housing 32 via threads 46 and 48 provided, respectively, on the base 26 and on the lower end 44 of the housing 32. Likewise, the head 24 secures to an upper end 50 of the housing 32 via threads 52 and 54 provided, respectively, on the base 26 and on the upper end 50 of the housing 32. A first o-ring 56 is provided between the base 26 and the lower end 44 of the housing 32 in order to prevent fluid from leaking between the base 26 and the lower end 44 the housing 32. A second o-ring 58 is provided between the head 24 and the upper end 50 of the housing 32 in order to prevent fluid from leaking between the head 24 and the upper end 50 the housing 32.

Likewise, a first compression ring 60 is provided between the base 26 and a lower end 62 of the compression sleeve 30 in order to prevent fluid from leaking between the base 26 and the lower end 62 of the compression sleeve 30. As second compression ring 64 is provided between the head 24 and an upper end 66 of the compression sleeve 30 in order to prevent fluid from leaking between the head 24 and the upper end 66 of the compression sleeve 30. The compression rings 60 and 64 also serve to hold the sleeve 30 securely to the housing 32 so that the sleeve 30 can not rotate or move longitudinally within the housing 32.

The shaft 68 of the oil well pump 14 extends upward within the casing 12 from the motor 20. The shaft 68 is composed of a plurality of shaft segments that are rotationally secured together with couplings. As illustrated in FIG. 1, one such shaft segment 68A extends through the inducer 10 and secures to other shaft segments (not illustrated) located below it in the shaft 68 by a means of a shaft coupling 72. The coupling 72 engages a splined lower end 74 of the shaft segment 68 and engages a splined end of another shaft segment directly below it in order to rotationally connect the shaft segment 68 together with shaft segments located below it in the shaft 68. The shaft segment 68A is also provided with a splined upper end 76 which, likewise, connects via an additional shaft coupling (not illustrated) to shaft segments located directly above it. This rotationally connects the shaft segment 68A to the shaft segments located above it. The connected shaft segments and shaft couplings form the shaft 68 that extends from the mouth of the well down to the down-hole equipment.

The shaft 68 extends through the pump 14, through the inducer 10, and through the gas separator 16. The base 26 and the head 24 of the inducer 10 are each provided with a shaft bearing, 78 and 80 respectively, through which the rotating shaft segment 68A extends.

The shaft bearing 78 is held in place within the base 26 by a first bearing support 82. The first bearing support 82 is provided with a plurality of first longitudinal openings 84 extending longitudinally through the first bearing support 82 so that fluid can pass through the first longitudinal openings 84 as the fluid passes through the inducer 10.

The shaft bearing 80 is held in place within the head 24 by a second bearing support 86. The second bearing support 86 is provided with a plurality of second longitudinal openings 88 extending longitudinally through the second bearing support 86 so that fluid can pass through the second longitudinal openings 86 as the fluid passes through the inducer 10.

The inducer 10 is provided with an auger 90 that extends longitudinally within the sleeve 30 of the housing 32 from the lower end 44 of the housing 32 to the upper end 50 of the housing 32. The auger 90 is provided with outwardly extending auger vanes 92 that secure spirally to a central cylindrical body 94 of the auger 90. The central cylindrical body 94 is provided with a central longitudinal opening 96 through which the shaft segment 68A extends. The auger 90 secures to the shaft segment 68A by means of keys 98. The keys 98 insert into longitudinally oriented key-receiving keyways or grooves 100 provided in the central cylindrical body 94 within the longitudinal opening 96 of the auger 90. At the same time, the keys 98 also insert into corresponding longitudinally oriented key-receiving keyways or grooves 102 that are provided in an external surface of the shaft segment 68A, as illustrated in FIG. 5. The grooves 100 are preferably provided 180 degrees from each other on the body 94, and likewise, the grooves 102 are preferably provided 180 degrees from each other on the shaft segment 68A. The keys 98 secure the auger 90 rotationally to the shaft segment 68A.

In order to prevent the auger 90 from moving longitudinally relative to the shaft segment 68A, the shaft segment 68A is provided with a first ring-receiving groove 104 that completely encircles the shaft segment 68A and is located adjacent the splined lower end 74 of the shaft segment 68A. Likewise, the shaft segment 68A is also provided with a second ring-receiving groove 106 that completely encircles the shaft segment 68A and is located adjacent the splined upper end 76 of the shaft segment 68A. The ring-receiving groove 104 receives therein a two piece ring 108. The ring-receiving groove 106 receives therein a snap ring 109. The two piece ring 108 and the snap ring 109 each extend outwardly from the shaft segment 68A forming two outwardly protruding and continuous lips around the shaft segment 68A. The lips formed by these two rings 108 and 109 trap the lower and upper ends 110 and 112 of the central cylindrical body 94 of the auger 90 between them so that the auger 90 can not move longitudinally relative to the shaft segment 68A.

It is important that the two piece ring 108 and the snap ring 109 prevent the auger 90 from moving longitudinally relative to the shaft segment 68A. Such longitudinal movement would loosen the keys 98 and allow the keys 98 to move out of the key-receiving grooves 100 and 102. This would disconnect the auger 90 from the shaft segment 68A and prevent the auger 90 from rotating with the shaft segment 68A. Without the auger 90 rotating, the inducer 10 would be inoperative. A spacing shim 111 is also provided between the snap ring 109 and the upper end of the auger 90.

The snap ring 109 also serves as a stop for a spacer 114. The spacer 114 is provided between the upper end 112 of the central cylindrical body 94 of the auger 90 and the second bearing support 86 for the shaft bearing 80 that is provided in the head 24.

The auger 90 secures to the shaft segment 68A between the shaft bearings 78 and 80 so that the auger 90 rotates with the shaft segment 68. The auger 90 is in close clearance with the compression sleeve 30. Thus, the fluid that enters the auger 90 at the lower end 110 is trapped between the auger 90 and the sleeve 30. The fluid is pushed upward by the rotating auger vanes 92 to the upper end 112, placing the fluid under increasing pressure as it approaches the upper end 112. Because the fluid is under pressure when it reaches the lower end 22 of the pump 14, any gas that remains in the fluid after it has passed through the gas separator 16 remains in the fluid as dissolved gas and does not come out of solution as free gas. Thus, the pump 14 runs more efficiently. Because of the increase in efficiency achieved by using the inducer 10, the size of the pump 14 can be decreased and the operating costs are also decreased.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A device for inducing flow of high viscosity crude oil into a centrifugal pump that is located down-hole in an oil well comprising:

a hollow housing with a base on one end and a head on an opposite end, said hollow housing provided with only two openings therein, one of the two openings being provided at the base and the other of the two openings being provided at the head, said base securing to an upper end of a gas separator and said head securing to a lower end of a centrifugal pump so that fluid exiting the gas separator flows through one of the openings to enter into said hollow housing and flows through the other of the openings before entering said pump, and pressure maintaining means provided within said hollow housing for placing fluid flowing through the hollow housing under pressure before the fluid enters the centrifugal pump.

2. A device according to claim 1 wherein said pressure maintaining means further comprises:

an auger secured around a submersible electric shaft so that the auger rotates in conjunction with the shaft, said auger longitudinally provided within said hollow housing so that fluid is pushed upward and placed under pressure as the fluid enters the inlet of the centrifugal pump by the auger as the auger rotates within the housing.

3. A device according to claim 2 further comprising:

a sleeve provided within said hollow housing, said auger rotatably provided within said sleeve.

4. A device according to claim 3 wherein said sleeve is constructed of abrasion resistant material.

5. A device according to claim 2 further comprising:

a first shaft bearing provided in said base for rotatably receiving said shaft and a second shaft bearing provided in said head for rotatably receiving said shaft.

6. A device according to claim 5 further comprising:

a first bearing support securing said first shaft bearing to said base, said first bearing support being provided with longitudinal openings for allowing fluid to pass through said base, and a second bearing support securing said second shaft bearing to said head, said second bearing support being provided with longitudinal openings for allowing fluid to pass through said head.

7. A device according to claim 2 wherein said auger further comprises:

at least one auger vane secured spirally around a central cylindrical body, said shaft extending through said central cylindrical body, and said central cylindrical body secured to said shaft so that said auger rotates in association with said shaft.

* * * * *